Nov. 29, 1960     R. SCARIONI     2,962,267
ICE-CREAM MOULDING MACHINE FOR REFRIGERATORS
Filed Sept. 24, 1957
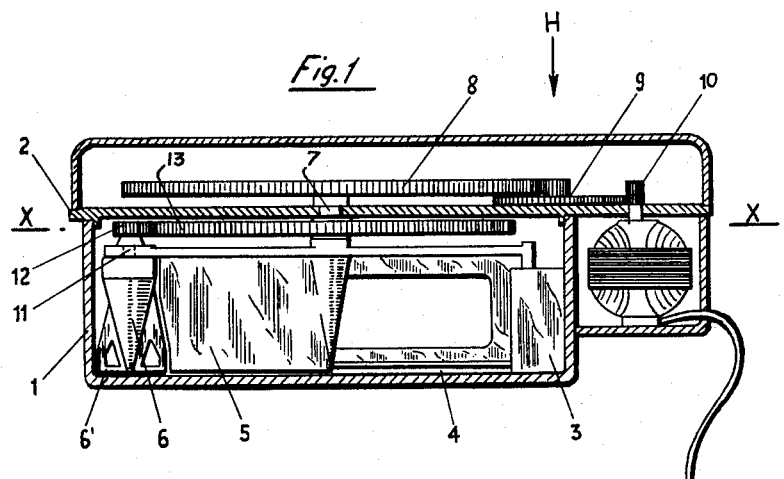
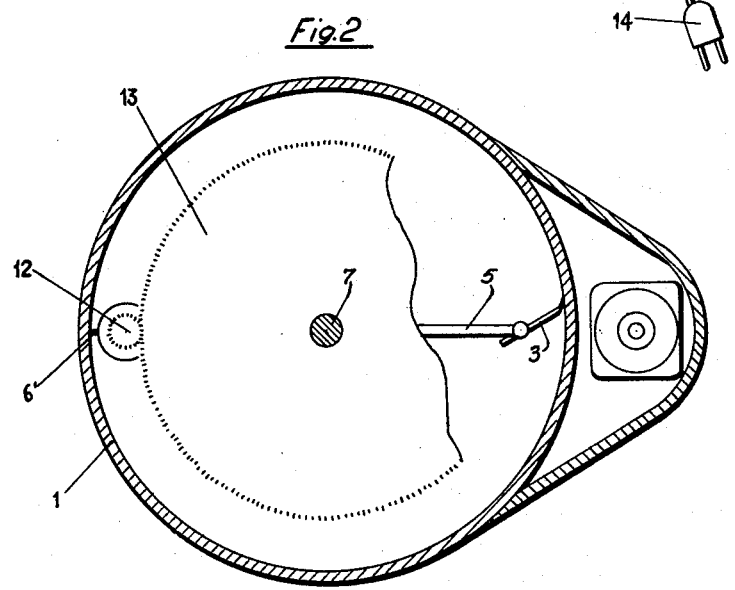
Inventor:
Romeo Scarioni
By Ernest G Montague
Attorney

United States Patent Office 2,962,267
Patented Nov. 29, 1960

2,962,267
ICE-CREAM MOULDING MACHINE FOR REFRIGERATORS

Romeo Scarioni, Via Ponti 2, Abbiategrasso, Milan, Italy

Filed Sept. 24, 1957, Ser. No. 685,883

Claims priority, application Italy Aug. 8, 1957

1 Claim. (Cl. 259—118)

The present invention relates to an ice-cream molding device.

It is one object of the present invention to provide an ice-cream molding machine designed for domestic use, which is adapted for the preparation of ice-cream at home, whereby domestic refrigerators are utilized.

It is another object of the present invention to provide an ice-cream molding machine the interior of which has suitable elements adapted to scrape the cylindrical wall as well as the bottom of the container constituting the molding machine, to prevent that the mixture contained in the container is frozen and hardened, and to assure rather that the ice-cream is retained as a morbid and even paste.

In addition to the scraping elements, others are arranged to stir the entire ice-cream mass in the container, achieving simultaneously a very accurate and predetermined mingling.

With these and other objects in view which will become apparent in the following detailed description, the present invention will be clearly understood in connection with the accompanying drawings, in which:

Figure 1 is a sectional elevation of the ice-cream molding machine; and

Fig. 2 is a section along the lines X—X of Fig. 1.

Referring now to the drawing, the ice-cream molding machine comprises a cylindrical vessel 1 open at its upper end and adapted to receive the mixture which will be converted into ice-cream.

A cover 2 rests on top of the vessel 1 and carries all essential elements performing the desired mechanical effects. Upon applying the cover 2 to the vessel 1, the elements, acting on the mixture, are inserted into the vessel 1.

Disposed inside the vessel 1, are the peripheral scraper 3 acting on the inner cylindrical wall of the vessel 1, the lower scraper 4 acting on the bottom of the vessel 1, the slow mixer 5 stirring the entire mass disposed in the vessel 1, and the speedy agitator 6 exerting a local rapid action tantamount with a peripheral movement covering the entire circumference of the vessel 1.

The mixer 5 is formed integrally with a pin 7 and with the toothed gear 8. This toothed gear 8 is driven by the speed reducer 9, which in turn is moved by the pinion 10.

The mixer 5, which consists substantially of a great rotating paddle or blade, carries the scrapers 3 and 4 properly pivoted and hingedly connected, so as to allow a perfect accommodation of the same to the vessel 1.

The mixer 5 carries also the agitator 6 which is integral with the shaft 11 as well as with the pinion 12. The agitator 6 is loosely carried by its bearing and due to the fact that its bearing rotates, and that the pinion 12 meshes with the gear 13 which is disposed non-rotatably below the cover 2 in the vessel 1 and coaxially with the axis of the mixer 5, the agitator 6 is forced to revolve on its axis at a high speed.

The agitator 6 has small vanes 6' exerting proper action upon the ice-cream which is in the status of formation.

The ice-cream molding machine, once filled with the mixture which will be turned or formed into ice-cream, is put into a refrigerator (not shown) and the connecting plug 14 will be inserted into a socket (not shown).

If the mixture becomes gradually dense or thick, the rotating paddle or blade of the mixer 5 slows down gradually, until a conventional electric switchgear operated by a small centrifugal device disconnects automatically the electric current and, consequently, stops the electric motor.

While I have disclosed one embodiment of the present invention, it is to be understood that this embodiment is given by example only and not in a limiting sense, the scope of the present invention being determined by the objects and the claim.

I claim:

An ice-cream freezing unit comprising a cylindrical vessel having a cover, a mixer rotatably supported by said cover by means of a vertical pin carrying at its upper end a driving gear, means for driving said gear in order to rotate said mixer, a peripheral scraper hingedly connected to and extending radially outwardly from the periphery of said mixer in order to scrape the inner cylindrical wall of said vessel, a lower scraper hingedly connected to the bottom portion of said mixer in order to scrape the bottom of said vessel, at least one agitator rotatably mounted upon a vertical pivot disposed at the periphery of said mixer, a pinion mounted on the upper end of said agitator and a non-rotatable gear immovably disposed below said cover and coaxially with the axis of said mixer to mesh continuously with said pinion, so that upon rotation of said mixer said agitator turns at a great speed and said mixer operates said peripheral scraper, said bottom scraper and said agitator upon rotation of said mixer.

References Cited in the file of this patent
UNITED STATES PATENTS

| | | |
|---|---|---|
| 1,444,910 | Goetz | Feb. 13, 1923 |
| 1,997,035 | Arbuckle | Apr. 9, 1935 |
| 2,555,624 | Anderson | June 5, 1951 |
| 2,719,031 | Morgan | Sept. 27, 1955 |
| 2,731,809 | Hackney | Jan. 24, 1956 |
| 2,817,502 | Yohe | Dec. 24, 1957 |